(12) United States Patent
Kelley

(10) Patent No.: US 6,257,462 B1
(45) Date of Patent: Jul. 10, 2001

(54) SELF-MEASURING DISPENSING CONTAINER

(76) Inventor: Scott A. Kelley, 16023 Sunbeam River, Houston, TX (US) 77084

( * ) Notice: Subject to any disclaimer, the term of this patent is extended or adjusted under 35 U.S.C. 154(b) by 0 days.

(21) Appl. No.: 09/196,290

(22) Filed: Nov. 19, 1998

(51) Int. Cl.[7] .................................................. G01F 11/26
(52) U.S. Cl. ............................................................ 222/456
(58) Field of Search ................................ 222/456, 481.5, 222/438, 434, 454, 457

(56) References Cited

U.S. PATENT DOCUMENTS

| | | | |
|---|---|---|---|
| 2,233,996 | * | 3/1941 | Dent ........................ 222/456 |
| 2,370,820 | * | 3/1945 | Stott ........................ 222/456 |
| 2,709,543 | * | 5/1955 | Appel ....................... 222/438 |
| 3,171,446 | * | 3/1965 | Koch ........................ 222/434 |
| 3,178,081 | | 4/1965 | Adams . |
| 3,217,948 | * | 11/1965 | Mullen ...................... 222/456 |
| 3,401,840 | * | 9/1968 | McConnell et al. ....... 222/456 |
| 3,837,542 | * | 9/1974 | Por .......................... 222/456 |
| 3,877,614 | | 4/1975 | Murphy . |
| 3,980,210 | | 9/1976 | Kligerman . |
| 4,424,921 | | 1/1984 | Feuerstein et al. . |
| 4,651,907 | | 3/1987 | Thomas . |
| 4,684,045 | | 8/1987 | Su . |
| 4,893,732 | * | 1/1990 | Jennings .................. 222/456 |
| 5,092,497 | * | 3/1992 | Toedter .................. 222/481.5 |
| 5,405,055 | * | 4/1995 | Hester ..................... 222/456 |
| 5,556,011 | * | 9/1996 | Jennings et al. ......... 222/455 |
| 5,810,210 | | 9/1998 | Kelley et al. . |

FOREIGN PATENT DOCUMENTS

683634 * 6/1930 (FR) ........................ 222/456

* cited by examiner

Primary Examiner—Andres Kashnikow
Assistant Examiner—Dinh Q. Nguyen
(74) Attorney, Agent, or Firm—Bracewell & Patterson, L.L.P.

(57) ABSTRACT

The present invention is a self-measuring container that dispenses only a specific amount of fluid each time fluid is poured from the container. This container has a storage chamber where the fluid initially resides and a measuring/dispensing chamber, below the storage chamber, where the specific amount of the fluid that will be dispensed during the next pouring operation resides. An aperture at one end of the container connects the storage and dispensing chambers. This aperture permits the fluid in the storage chamber to flow into the dispensing chamber. The container dispenses the fluid through an exit channel that extends from the dispensing chamber to the top of the container. The storage chamber bottom serves to separate the storage and dispensing chambers and acts as a barrier during a pouring operation to prevent fluid from flowing from the storage chamber to the dispensing chamber until desired. The measuring chamber may also contain a diaphragm to permit the volume within the chamber to be adjusted.

24 Claims, 6 Drawing Sheets

US 6,257,462 B1

SELF-MEASURING DISPENSING CONTAINER

FIELD OF THE INVENTION

This invention relates to an apparatus for containing and dispensing fluid and more particular to a container having an integral measuring device for dispensing a predetermined volume of liquid.

BACKGROUND OF THE INVENTION

The use of liquid products pervades all aspects of life. There are many types of containers that hold these products. For many applications, the entire contents of a container may be used at one time. For other applications, only a small amount of the liquid product may be required for an application, such as washing detergents, bleaches, cooking oils, insecticides, etc. In cases where only a small amount of the product is required at any one time, there is usually a need to measure the amount of the product to use in that application. One common measuring means utilizes the container cap as the measuring device. The cap may have a built-in cup with various gradations or "fill lines" representing different liquid volumes. Other containers may have graduations along the side to assist in dispensing a desired amount of liquid. Where such measuring aids are not incorporated into the container itself, one may have to find other means to measure the amount of liquid necessary for a specific application. The extra time and effort needed to find and utilize a suitable measuring device presents added difficulties. The procedure of pouring the liquid from the storage container to a measuring container and then to the container in which the liquid is to be utilized is a tedious and time-consuming process. In addition, because of the variations in the size and shape, sight-measuring aids such as this can yield inaccurate and imprecise results.

There are many different containers that dispense fluid in measured amounts, where the container holds a substantially greater amount of the liquid relative to the dispensed amount. Many of these devices have the capacity to store, measure and dispense liquids without the need for sight measuring. Such characteristics are desirable especially when contact with the liquid could be harmful to humans, such as poisons, bleach, etc. Typically however, prior art devices capable of dispensing a measured volume of liquid are unduly complex in design and manufacture, undependable and expensive. In addition, the complex design of these prior art containers often inhibits all of the fluid within the containers from being dispensed. In other words, the designs result in an amount of fluid being trapped in their respective containers, being unable to be completely emptied.

Specifically, many such pouring devices have been made which themselves combine the pouring function and the measuring function so that as the pouring operation proceeds, a fixed volume of liquid will be dispensed with each pouring operation. However, many of these devices are bulky and have complicated inner structures. In addition, the complexity of the device make it difficult and expensive to manufacture. Further, many of these devices are undependable and inaccurate when attempts are made to rapidly and successively dispense liquid therefrom in controlled quantities. Therefore, there remains a need for a self-measuring container that can reliably dispense a specific amount of liquid while at the same time having a simplified structure which facilitates manufacturing.

SUMMARY OF THE INVENTION

It is an object of the present invention to provide a container that dispenses a specific amount of a liquid substance during each pouring operation.

It is another objective of the present invention to provide a self-measuring dispensing container in which the amount of measured liquid to be dispensed can be adjusted.

It is another objective of this invention to provide a self-measuring dispensing container that is only one piece.

It is a fourth objective of the present invention to provide a container that automatically measures a specific amount of the liquid in the container for pouring.

The present invention is a container that dispenses only a specific amount of a liquid substance each time the liquid is poured from the container. This container has a storage chamber or reservoir where the liquid initially resides and a dispensing chamber, below the storage chamber, where the specific amount of the liquid that will be dispensed during the next pouring operation resides. An aperture at one end of the container connects the storage and dispensing chambers. This aperture permits the liquid in the storage chamber to flow into the dispensing chamber. The container dispenses the substance through an exit channel that extends from the dispensing chamber to the top of the container. A second channel provides a vent to the storage and dispensing chamber. Finally, a diaphragm adjacent the dispensing chamber permits the volume of said chamber, and hence the volume of liquid measured therein, to be adjusted.

In operation, the container is initially filled with a liquid. In an upright position, the fluid in the storage chamber will flow into the dispensing chamber until the dispensing chamber is full. During a pouring operation, the container is tilted to pour the liquid from the dispensing chamber. The liquid in the dispensing chamber will exit the container through the exit channel. The tilted position of the container and the bottom of the storage chamber prevent any of the liquid in the storage chamber from flowing into the dispensing chamber and through the exit channel. After the pouring operation ends, the container is repositioned to an upright/vertical position. As the tilt angle decreases during the repositioning of the container, the liquid in the storage chamber again begins to flow into the now empty dispensing chamber. The flow of liquid into the dispensing chamber will continue until the dispensing chamber becomes full. The container is then ready for the next pouring operation. The position of the aperture between the two chambers permits substantially all of the liquid within the container to be dispensed.

DETAILED DESCRIPTION OF THE PREFERRED EMBODIMENT

Figures 1, 2:
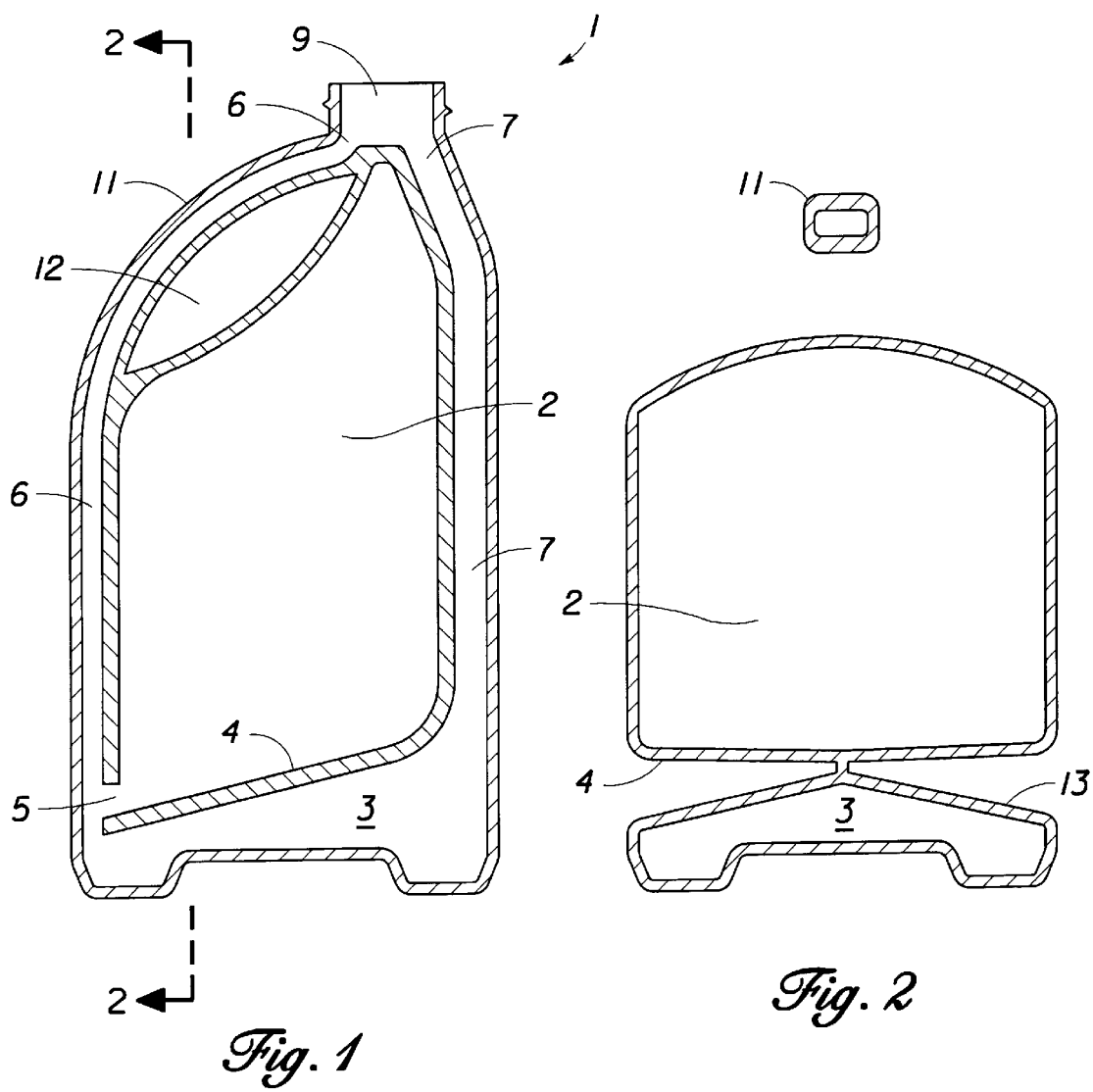
FIG. 1 is a cut-away side view of the preferred embodiment of the present invention.
FIG. 2 is a isolated sectional view of the storage and dispensing chambers.

Referring to FIG. 1, there is shown a conceptual view of the first preferred embodiment of the invention. The container 1 has two chambers; a storage chamber 2 and a measuring/dispensing chamber 3. Initially, container 1 is charged with an amount of fluid to fill both chambers 2, 3, wherein the storage chamber 2 is disposed to receive the greatest quantity of said fluid. Once the storage chamber 2 has initially been filled, residual fluid will flow or remain in the dispensing chamber. This fluid will become part of the initial measured volume dispensed from the container. The storage chamber 2 and the dispensing chamber 3 are positioned vertically with respect to each other. In one embodiment (not shown), the storage chamber bottom 4 separates the two chambers and serves as the top of dispensing chamber 3. An aperture 5 adjacent bottom 4 connects storage chamber 2 and dispensing chamber 3. Aperture 5 permits fluid to flow from the storage chamber 2 to the dispensing chamber 3.

The container has two channels leading into the container. Depending on the filling mode chosen, a primary venting channel 6 permits air to exit or fluid to enter the container during the filling process. Channel 6 also provides venting during a pouring operation, permitting internal and external air pressures to equalize. In this function, air enters the container through this channel as fluid exits the container. Fluid exits the container through exit channel 7 that runs from the dispensing chamber 3 to the top opening 9 of container 1. Venting channel 6 and exit channel 7 terminate at opening 9. To facilitate filling, it may be desirable to provide a small aperture extending from opening 9 into the interior of storage chamber 2. This aperture is for the purpose of venting during the process of filling the storage chamber 2 when container 1 is filled in the upright position. Once container 1 has been filled, this aperture can be sealed using any standard means, such as for example, plugging, spin welding, ultra sonic sealing, etc. Otherwise, the aperture can be left in place. However, due to its small size, only an insignificant amount of fluid will drip therefrom during the pouring mode. Alternate processes for filling container 1 can also be used. For example, the container may be pressure filled in an inverted position utilizing primary vent 6 for fluid introduction and utilizing exit channel 7 for venting. Alternatively, if filled upright, the primary vent tube 6 may extend only partially down along the side of container 1. This will allow less air to be trapped in the top portion of the container during filling. If desired, air can also be evacuated from the container before filling. When venting an embodiment with substantially separate venting and pouring channels, the vent may be no more than a simple aperture. In one embodiment, the primary venting channel 6 may extend through a container handle 11 used to carry the container and to pour liquid from the container. As shown, the handle 11 may be shaped such that there is clearance area 12 under the handle to allow a person to grip the handle.

Figure 4:
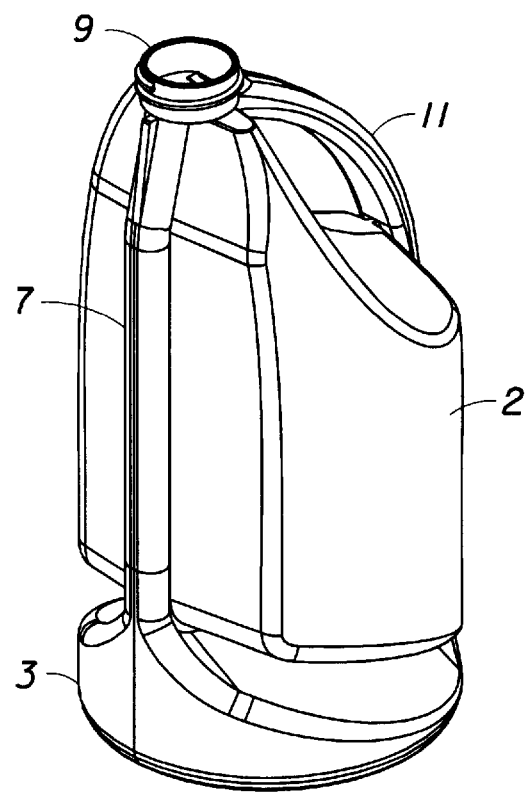
FIG. 4 is a elevation view of the front of the container of the present invention.
Figure 7:
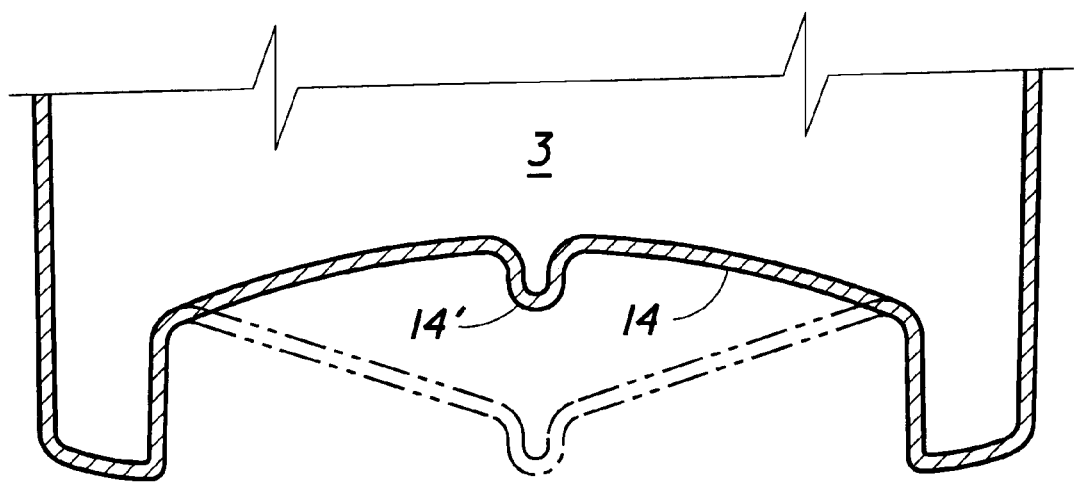
FIG. 7 is a cut away side view of the adjustment diaphragm located in the wall of the measuring and dispensing chamber.

FIG. 2 shows an isolated sectional view of the storage chamber 2 and dispensing chamber 3. Both of the chamber are completely enclosed except for the connecting aperture 5. As shown in this preferred embodiment of FIG. 4, the two chambers do not share a common side. The storage chamber has a bottom 4 that is completely separate from the top 13 of dispensing chamber 3. Although, the chambers in this embodiment do not share a common side, the invention can operate as designed if the chambers did share a common side. The advantage of distinct sides is that this design permits the chamber volume to be precisely adjusted during manufacture and to facilitate one piece molding. The dispensing chamber is design such that only a defined volume can fit in the chamber. This defined volume being the specific amount dispensed during each pouring operation. The design of FIG. 4 shows the possibility of fluid being stored in the exit channel, however, because of the small size of the channel, only minimal amounts of fluid be present in the channel. The dispensing chamber can also contain a diaphragm 14 in the bottom of the chamber as shown in FIG. 7. This diaphragm 14 can be adjusted as desired to change the volume of the dispensing chamber and thus change the amount of fluid dispense with each pouring operation. In the embodiment shown, diaphragm 14 is provided with a grip 14' to permit ease in adjustment. Although the volume control mechanism has been described as a diaphragm, those skilled in the art will understand that any configuration for adjusting the volume within measuring chamber 3 can be used with the invention.

Figure 3:
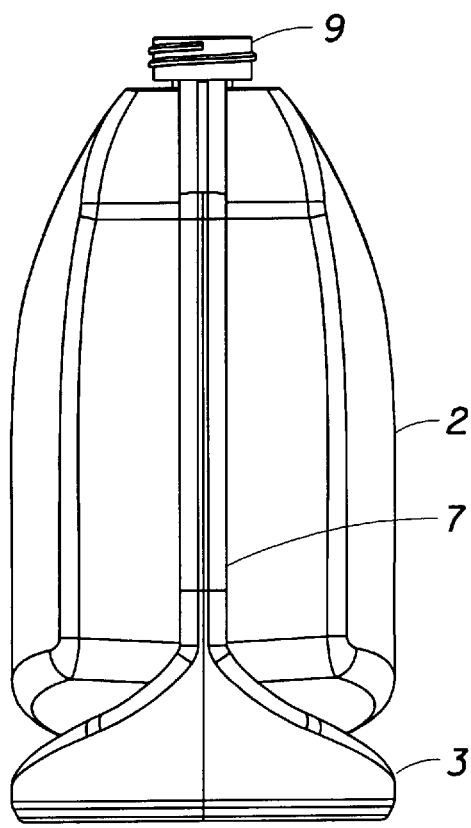
FIG. 3 is a front view of the present invention.

FIG. 3 shows a front view of the present invention. During a pouring operation, fluid exits the dispensing chamber 3, travels through the exit channel 7 and exits the container through the top opening 9. FIG. 4 gives a full frontal view of the container and shows the relationship between the storage chamber 2, the dispensing chamber 3, the exit channel 7 and the top 9.

Figure 5:
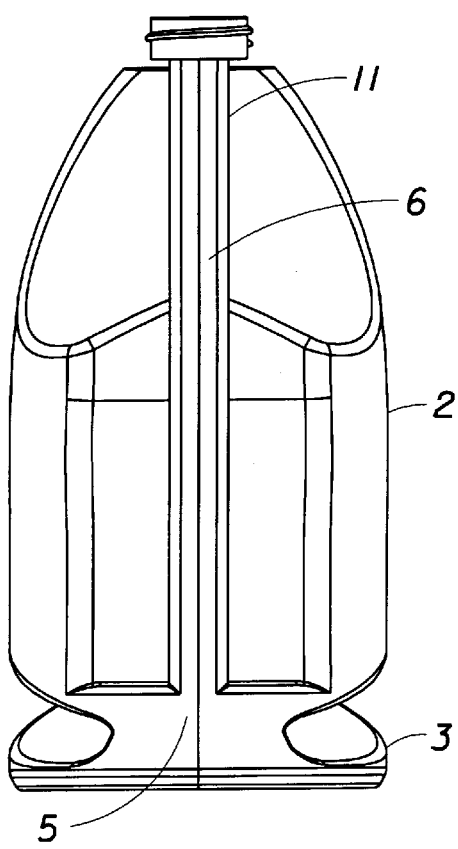
FIG. 5 is a back view of the present invention.
Figure 6:
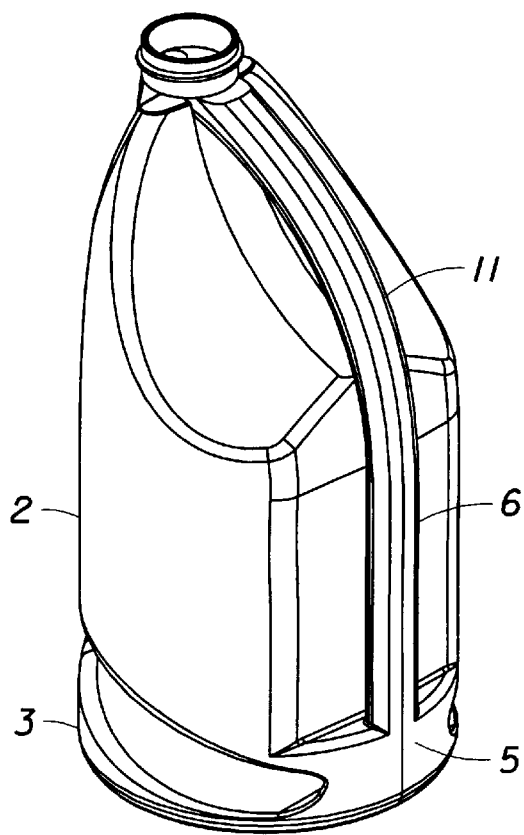
FIG. 6 is a elevation view of the back of the container of the present invention.

FIG. 5 shows back view of the present invention. This view illustrates the external position of handle 11 in which is located vent tube 6. Air will enter the container through top opening 9, travel through the primary vent channel 6, and into the dispensing chamber 3 and storage chamber 2. FIG. 6 gives a full rear view of the container and shows the relationship between storage chamber 2 and dispensing chamber 3 In addition, although not specifically shown, FIG. 6 illustrates the general area in which vent channel 6 and connecting aperture 5 are located within container 1.

Figure 8:
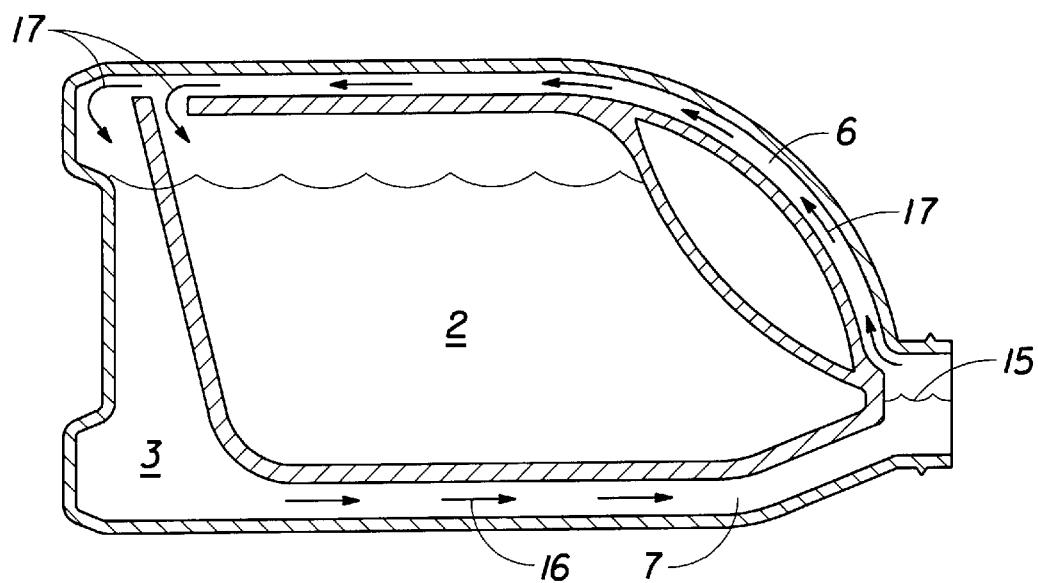
FIG. 8 is a cut away side view of the container of the present invention in a tilted position.

FIG. 8 illustrates the container of the present invention filled with fluid 16 and disposed in a fluid dispensing position. As the tilt begins, fluid 16 in the dispensing chamber flows through the exit channel 7. Initially, in an upright position (see FIG. 9), fluid flow between storage chamber 2 and dispensing chamber 3 through aperture 5 is uninhibited. However, as the tilt angle increases, flow between chamber 2 and chamber 3 is cut off. As the fluid 16 contained in chamber 3 flows through exit channel 7, air 17 enters the container through channel 6. The air flows through the vent channel 6 and enters the storage chamber 2 and the dispensing chamber 3. Eventually, as exit channel 7 is tilted to a position substantially parallel with the horizontal, fluid 16 in the dispensing chamber 3 completely flows out of the container. The fluid still in the storage chamber 2 is prevented from flowing into the dispensing chamber 3 since aperture 5 is above the surface level of the fluid contained in chambers 2 and 3.

Figure 9:
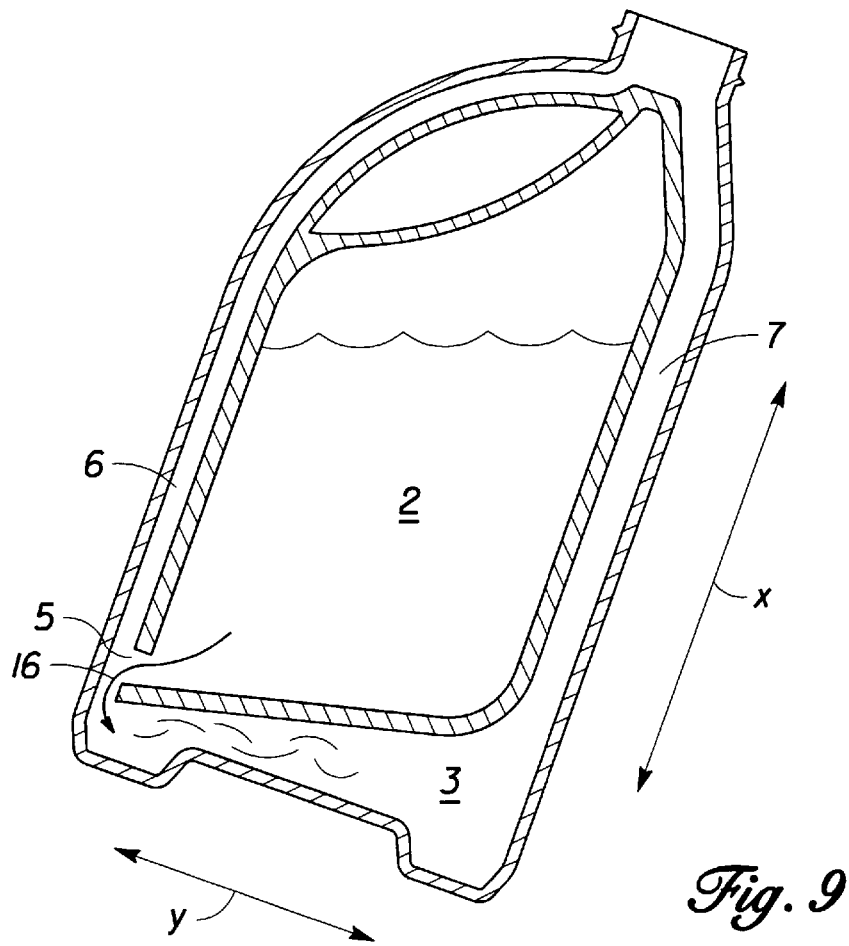
FIG. 9 is a cut away side view of the container of the present invention illustrating fluid flow when the container is in an upright position.

FIG. 9 illustrates fluid flow in container 1 after the pouring operation has been completed and the container is returned to its upright position. As the tilt angle of the container decreases, the fluid in the storage chamber 2 will begin to flow into the connecting channel 5 and into the dispensing chamber 3. The fluid 16 entering the dispensing chamber 3 will force any air in that chamber into the exit channel 7 or the vent channel 6. Fluid will continue to flow until the dispensing chamber into the chamber volume is full of fluid and the fluid pressure equalizes in the container. When the container is in the upright position, the dispensing container will refill with fluid. This volume of fluid will be the amount of fluid dispensed during the next pouring operation.

An additional advantage of the container of the present invention is that it can be constructed in a single piece. Although there are a number of methods known in the art to accomplish such construction, one preferred method is blow molding.

Figure 10:
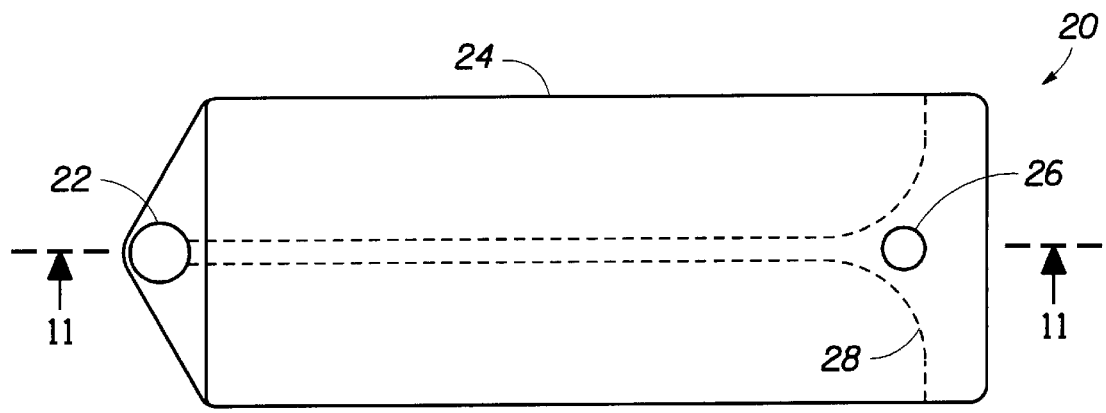
FIG. 10 is a top view of an embodiment of the container wherein the container is provided with a low center of gravity.
Figure 11:
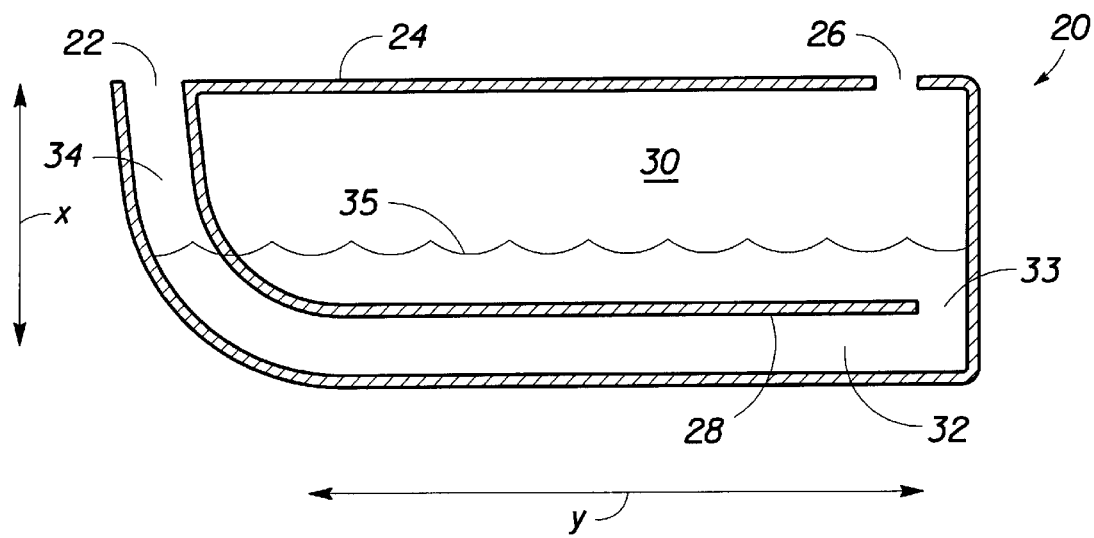
FIG. 11 is a cut away side view of the container of FIG. 10.

FIGS. 10 and 11 illustrate another embodiment of the invention wherein the container is provided with a low profile for use with heavier fluids, such as lubricating fluids. The low profile results in a lower center of gravity. In addition, the low profile obviates the need for a second air vent channel. Specifically in FIG. 10, a substantially rectangular container 20 is provided with a pour spout 22 in a top surface 24. Also provided in top surface 24 is a vent aperture 26. Shown in phantom is wall 28 which can also be seen in FIG. 11. FIG. 11 more clearly shows the first storage chamber 30 below which is located the second measuring chamber 32. An aperture 33 is provided to permit fluid flow between first chamber 30 and second chamber 32. An exit channel 34 is provided between second chamber 32 and spout 22. Wall 28 may be disposed to define channel 34. In addition, wall 28 may be utilized to separate and define first chamber 30 and second chamber 32. Aperture 33 is positioned to be at a point opposite pour spout 22 so that as container 20 is tilted to produce fluid flow from pour spout 22, aperture 33 is raised above the fluid surface level 35 of both first chamber 30 and second chamber 32, preventing fluid flow therebetween. In this manner, only fluid in second measuring chamber 32 can be poured from container 20. Once a pouring operation is complete and container 20 is returned to a substantially upright or untilted position (illustrated in FIG. 11), the fluid surface level 35 of the fluid in first chamber 30 rises above aperture 33 to permit fluid flow into measuring chamber 32.

In the embodiment shown in FIGS. 10 and 11, the low profile of container 20 can be characterized by a vertical length X and an horizontal length Y. As can be seen in FIG. 11, vertical length X is substantially equivalent to the length of channel 34, while horizontal length Y is substantially equivalent to the length of second chamber 32. Because of the large surface area of top surface 24, pour spout 22 and vent aperture 26 can be located apart from one another, preferably at distal points from one another on surface 24. In so doing, the possibility of fluid escaping though vent aperture 26 is diminished. Those skilled in the art will understand that in the other embodiments of the invention taught above, the comparatively small top surface of upright containers, i.e., containers with tall profiles, necessitates positioning of the exit channel adjacent the vent channel. However, as the length of the container increases, the possible separation distance between the vent channel and the exit channel increases. In other words, as the horizontal length Y of container 20 increases, the need for a vent channel as shown in the other embodiments of the invention decreases. Rather, a simple vent aperture such as vent aperture 26 may be utilized. Likewise, as the horizontal length of Y increases, the volume of second chamber 32 increases and the significance of any residual fluid in exit channel 34 decreases. In other words, as the X:Y ratio decreases, pour accuracy increases and permits faster pour due to a shorter exit channel length.

The apparatus of this invention provides significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention, which is limited only by the following claims.

What is claimed is:

1. A container for pre-measuring an amount of liquid to be poured from said container, said container movable between a first measuring position in which the container is substantially upright to a second pouring position in which the container is substantially horizontal, said container comprising:

a) a storage chamber for receiving and storing a volume of fluid, said storage chamber having first and second side walls substantially parallel to one another, and a bottom wall extending therebetween, said bottom wall sloping downward from the second side wall to the first sidewall, said storage chamber further having a single storage chamber opening therein, said storage chamber opening located at the intersection of said first side wall and the lowest portion of said bottom wall;

b) a measuring chamber for measuring a specific volume of fluid to be dispensed from said container, said measuring chamber having a sloping top measuring chamber wall defined by the bottom wall of the storage chamber and a measuring chamber bottom wall, said measuring chamber in communication with a single pour spout opening, located above said storage chamber, through which fluid exits said measuring chamber and air enters said measuring chamber and said storage chamber, said measuring chamber being located below said storage chamber and being in fluid communication with said storage chamber via said storage chamber opening, wherein said storage chamber opening allows liquid to flow from said storage chamber to said measuring chamber only when the container is in a substantially upright position;

c) a vent passage, said vent passage being defined by the first wall of the measuring chamber and a first outer wall of said container, wherein said vent passage extends from said single spout opening to said measuring chamber;

d) a fluid passage, said fluid passage being defined by the second wall of the storage chamber and a second outer wall of said container, said fluid passage being located on a substantially opposite side of the container from the vent passage, wherein said fluid passage passes from the single spout opening to the measuring chamber; and e) wherein said container is formed of a single, integrally molded construction.

2. The container of claim 1 wherein said container has a first channel extending from said measuring chamber to a container top opening located adjacent the storage chamber.

3. The container of claim 2 wherein said container has a second channel extending from said container top opening towards said measuring chamber.

4. The container of claim 3 wherein said first and second channels are tubes.

5. The container of claim 3 further comprising a handle.

6. The container of claim 5 wherein said second channel extends through said handle.

7. The container of claim 3 wherein said storage chamber top portion has a sealable opening.

8. The container of claim 3 wherein said second channel is sealable.

9. The container of claim 1 further comprising a volume adjustment mechanism adjacent said measuring chamber.

10. The container of claim 9 wherein said volume adjustment mechanism is a diaphragm.

11. The container of claim 1 wherein said container and said measuring chamber have a common bottom.

12. The container of claim 1 wherein said storage chamber and said measuring chamber are integral.

13. The container of claim 1 further comprising a vent for said storage chamber.

14. The container of claim 1, wherein the intersection of said second side wall and said bottom wall is defined by an angle of less than ninety degrees.

15. A self-measuring container, having a first storage position in which the container is substantially upright and a second pouring position in which the container is substantially horizontal, said container comprising:
  a) a first means for storing a volume of liquid in said container, said first storing means defined by an inner wall having first and second side portions wherein said first and second side portions are substantially parallel to and opposite one another, said first means further defined by a bottom wall extending between said first and second side portions, said bottom wall sloping downward from the second side portion to the first side portion, said storage chamber still further having a single storage chamber opening therein, said opening located at the intersection of said first side portion and the lowest portion of said bottom wall, wherein the intersection of said first side portion of said inner wall and said bottom wall is defined by an angle of less than ninety degrees;
  b) a second means for measuring a specific amount of fluid to be dispensed from said container, said second measuring means located below said first means and having a side wall and further having a top wall defined by the sloping bottom wall of said first means, said second means in communication with said first means via said storage chamber opening wherein liquid can flow from said first means to said second means when said container is in the first position;
  c) a fluid exit means through which fluid can flow from said second measuring means out of said container;
  d) an air vent means through which air can flow into said container to facilitate venting of said first and second means, said air vent means being in fluid communication with said storage chamber opening;
  e) an outer wall having first and second outer side portions wherein said first and second outer side portions are substantially parallel to and opposite one another, said first outer side portion extending substantially parallel with and spaced apart from said first inner side portion to define said fluid exit means, said second outer side portion extending substantially parallel with and spaced apart from said second inner side portion to define said air vent means, wherein the outer wall forms the side wall of said second means;
  f) only a single pour spout located in the outer wall and above said first storage means, wherein a first end of each of said fluid exit means and said air vent means terminates at said single pour spout such that each of said fluid exit means and said air vent means is in fluid communication with said single pour spout;
  g) wherein a second end of each of said fluid exit means and said air vent means terminates at the second means thereby permitting said second means to be in dual fluid communication with said single pour spout, the terminus for said second ends being substantially opposite one another within said second means, the terminus for said air vent means being adjacent the storage chamber opening such that said air vent means is in communication with said storage chamber opening to permit air to flow therethrough when said container is in the second pouring position; and
  h) wherein said container is formed of a single, integrally molded construction.

16. The container of claim 15 wherein said first storage means is located above said second storage means.

17. The container of claim 16 wherein said first storing means is defined by a bottom with an aperture therein through which fluid can flow from said first storing means to said second measuring means.

18. The container of claim 15 further comprising a top opening located adjacent said first storage means, said top opening in fluid communication with said fluid exit means and said air vent means.

19. The container of claim 15 wherein said first storage means has a opening in said top portion.

20. The container of claim 15, wherein the single pour spout in the outer wall is located adjacent the second portion of said outer wall.

21. The container of claim 15, wherein the single pour spout in the outer wall is located approximately midway between the first and second portions of said outer wall.

22. A container for pre-measuring an amount of liquid poured from said container, said container comprising a substantially enclosed exterior wall, a single dispensing opening in said exterior wall and a first internal storage chamber formed within said substantially enclosed exterior wall, said internal storage chamber having first and second side walls spaced apart from the exterior wall and substantially parallel to one another, and a bottom wall extending therebetween, said bottom wall sloping downward from the second side wall to the first sidewall, said storage chamber further having a storage chamber opening therein, said storage chamber opening located at the intersection of said first side wall and the lowest portion of said bottom wall, said internal storage chamber disposed within said substantially enclosed exterior wall so as to form a second measuring chamber below said internal storage chamber, said second chamber having a sloping top measuring chamber wall defined by the bottom wall of the internal storage chamber and a measuring chamber bottom wall, a first channel formed in the annulus between said exterior wall and said first side wall of said internal storage chamber, said first channel extending from said second chamber to said dispensing opening, a second channel formed in the annulus between said exterior wall and said second side wall of said internal storage chamber, said second channel extending from said second chamber to said dispensing opening, wherein said first and second channels are substantially opposite one another along said exterior wall, and wherein said container is formed of a single, integrally molded construction.

23. The container of claim 22, wherein two channels are formed in the annulus between said exterior wall and said storage side portion, the channels being located within said container substantially diametrically opposed to one another.

24. The container of claim 23, wherein said aperture in fluid communication with said second chamber opens into said second channel adjacent the juncture of said second channel and said second chamber.

* * * * *